United States Patent
Qu

(10) Patent No.: US 12,034,674 B2
(45) Date of Patent: Jul. 9, 2024

(54) RESOURCE ALLOCATION METHOD AND APPARATUS FOR V2X SERVICE, AND STORAGE MEDIUM, TERMINAL AND BASE STATION

(71) Applicant: BEIJING UNISOC COMMUNICATIONS TECHNOLOGY CO., LTD., Beijing (CN)

(72) Inventor: Xin Qu, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 370 days.

(21) Appl. No.: 17/598,169

(22) PCT Filed: Mar. 11, 2020

(86) PCT No.: PCT/CN2020/078815
§ 371 (c)(1),
(2) Date: Sep. 24, 2021

(87) PCT Pub. No.: WO2020/199876
PCT Pub. Date: Oct. 8, 2020

(65) Prior Publication Data
US 2022/0173875 A1    Jun. 2, 2022

(30) Foreign Application Priority Data
Mar. 29, 2019 (CN) .......................... 201910250647.2

(51) Int. Cl.
*H04L 5/00* (2006.01)
*H04W 76/25* (2018.01)

(52) U.S. Cl.
CPC .......... *H04L 5/0057* (2013.01); *H04L 5/0064* (2013.01); *H04W 76/25* (2018.02)

(58) Field of Classification Search
CPC ....... H04L 5/0057; H04L 5/0064; H04L 1/08; H04L 1/0003; H04L 1/0009;
(Continued)

(56) References Cited

U.S. PATENT DOCUMENTS

| 10,506,402 B2 | 12/2019 | Rajagopal et al. |
| 2012/0033571 A1 | 2/2012 | Shimezawa et al. |

(Continued)

FOREIGN PATENT DOCUMENTS

| CN | 103068047 A | 4/2013 |
| CN | 103580812 A | 2/2014 |

(Continued)

OTHER PUBLICATIONS

Zte et al. "Consideration on NR V2X mode 1 resource allocation" 3GPP TSG-RAN WG2#104 R2-1816980, Nov. 16, 2018 (Nov. 16, 2018), section 2.1.3 (3 pages).

(Continued)

*Primary Examiner* — Don N Vo
(74) *Attorney, Agent, or Firm* — Harness, Dickey & Pierce, P.L.C.

(57) ABSTRACT

Disclosed are a resource allocation method and apparatus for a V2X service, and a storage medium, a terminal and a base station. The method comprises: acquiring resource allocation auxiliary information of a secondary link with a resource allocation requirement; and transmitting secondary link information, wherein the secondary link information comprises the resource allocation auxiliary information, and the resource allocation auxiliary information is associated with a destination identifier of the secondary link.

15 Claims, 3 Drawing Sheets

(58) Field of Classification Search
CPC ... H04L 1/0026; H04L 5/0053; H04L 5/0094; H04L 5/0055; H04W 76/25; H04W 4/40; H04W 24/10; H04W 92/18; H04W 72/20; H04W 72/54; H04W 72/542
USPC ........................................................ 455/452.2
See application file for complete search history.

(56) References Cited

U.S. PATENT DOCUMENTS

| | | | |
|---|---|---|---|
| 2018/0103460 | A1 | 4/2018 | Sharma et al. |
| 2018/0351622 | A1 | 12/2018 | Xi et al. |
| 2019/0045521 | A1 | 2/2019 | Hong et al. |
| 2019/0215136 | A1* | 7/2019 | Zhou ...................... H04L 1/1819 |
| 2019/0222982 | A1* | 7/2019 | Cao .......................... H04W 4/40 |
| 2020/0296762 | A1* | 9/2020 | Sun ......................... H04B 7/0695 |
| 2020/0305176 | A1* | 9/2020 | Hu ........................ H04B 7/0626 |
| 2021/0226726 | A1* | 7/2021 | Zhao ..................... H04L 1/0025 |
| 2022/0030647 | A1* | 1/2022 | Lee ........................ H04W 72/20 |

FOREIGN PATENT DOCUMENTS

| | | |
|---|---|---|
| CN | 104954976 A | 9/2015 |
| CN | 107306170 A | 10/2017 |
| CN | 107592327 A | 1/2018 |
| CN | 107995605 A | 5/2018 |
| CN | 108605329 A | 9/2018 |
| CN | 109039569 A | 12/2018 |
| CN | 109246659 A | 1/2019 |
| EP | 2922360 A1 | 9/2015 |
| JP | 2010522467 A | 7/2010 |
| JP | 2012135051 A | 7/2012 |
| JP | 2017514347 A | 6/2017 |
| WO | 2008115134 A2 | 9/2008 |
| WO | WO-2017128289 A1 | 8/2017 |

OTHER PUBLICATIONS

International Search Report (in English and Chinese) and Written Opinion of the International Searching Authority (in Chinese) issued in PCT/CN2020/078815, mailed on May 27, 2020; ISA/CN.
Extended European Search Report regarding Application No. 20781747.9 dated Jul. 20, 2022.
Fraunhofer HHI et al., "Resource Allocation Prodedures for NR V2X", 3rd Generation Partnership Project, Sophia-Antipolis Cedex, France; vol. RAN WG2, No. Xi'an, China; Mar. 28, 2019.
Huawei et al., R1-1900023, sidelink physical layer procedures for NR V2X, 3GPP TSG RAN WG1 #AH, 3GPP server publication date(Jan 11, 2019).
Office Action mailed Feb. 2, 2023, in Korean Application No. 10-2021-7035110.
Office Action mailed Jan. 20, 2023, regarding Japanese Application No. 2021-557440.
Office Action mailed Sep. 13, 2022, regarding Japanese Application No. 2021-557440.
Oppo: "Physical layer procedure for NR-V2X", 3rd Generation Partnership Project, Mobile Competence Center; Sophia-Antipolis Cedex, France; vol. RAN WG1, No. Taipei; Jan. 20, 2019.
Oppo: "Physical layer procedure for NR-V2X", vol. RAN WG1, No. Taipei; Jan. 20, 2019.
Fraunhofer HHI et al., "Resource Allocation Procedures for NR V2X", vol. RAN WG2, No. Xi'an, China; Mar. 28, 2019.

* cited by examiner

RESOURCE ALLOCATION METHOD AND APPARATUS FOR V2X SERVICE, AND STORAGE MEDIUM, TERMINAL AND BASE STATION

CROSS-REFERENCE TO RELATED APPLICATIONS

This application is a National Stage of International Application No. PCT/CN2020/078815, filed on Mar. 11, 2020, which claims the priority to Chinese Application No. 201910250647.2, filed on Mar. 29, 2019, both of which are incorporated herein by reference.

TECHNICAL FIELD

The present disclosure generally relates to a resource allocation method and apparatus for Vehicle-to-Everything (V2X) service, a storage medium, a terminal and a base station.

BACKGROUND

With the development of the 3rd Generation Partnership Project (3GPP), New Radio (NR) V2X as a key technical direction of Release 16 (R16) of a standard is being studied. NR V2X, as an enhancement of Long Term Evolution (LTE) V2X, is a key technical means to enable the Internet of Vehicles.

NR V2X includes two resource allocation methods including mode 1 and mode 2. In mode 1, a base station allocates secondary link transmission resources to a User Equipment (UE) (hereinafter referred to as a transmitting UE) as a transmitter in a secondary link.

According to the provisions of the latest standard, a single transmitting UE can maintain multiple secondary link communication links at the same time.

SUMMARY

Embodiments of the present disclosure optimize contents contained in secondary link information reported by a UE in mode 1, so that resources allocated to a secondary link by a base station are more adapted to an actual channel state of the secondary link, which may avoid confusion among multiple secondary links.

In an embodiment of the present disclosure, a resource allocation method for V2X service is provided, including: acquiring resource allocation auxiliary information of a secondary link with a resource allocation requirement; and transmitting secondary link information, wherein the secondary link information includes the resource allocation auxiliary information, and the resource allocation auxiliary information is associated with a destination identifier of the secondary link.

In an embodiment of the present disclosure, a resource allocation method for V2X service is provided, including: receiving secondary link information, wherein the secondary link information includes resource allocation auxiliary information which is associated with a destination identifier of a secondary link; and determining a resource allocated to the secondary link based on the resource allocation auxiliary information.

In an embodiment of the present disclosure, a storage medium having computer instructions stored therein is provided, wherein when the computer instructions are executed, the above method is performed.

DETAILED DESCRIPTION

As described in the background, there is no solution on how the base station allocates resources for multiple secondary links corresponding to one transmitting UE, and how the transmitting UE reports information about each secondary link to the base station. Therefore, technical development requirements for NR V2X scenarios cannot be met.

In an embodiment of the present disclosure, a resource allocation method for V2X service is provided, including: acquiring resource allocation auxiliary information of a secondary link with a resource allocation requirement; and transmitting secondary link information, wherein the secondary link information includes the resource allocation auxiliary information, and the resource allocation auxiliary information is associated with a destination identifier of the secondary link.

Embodiments of the present disclosure may optimize contents contained in secondary link information reported by a UE in mode 1, so that the base station can accurately acquire specific information (such as an actual channel state of each secondary link) of multiple secondary links maintained by the same transmitting UE, and allocate resources in a targeted manner based on data transmission requirements on each secondary link, which may avoid confusion among multiple secondary links.

In order to clarify the objects, characteristics and advantages of the disclosure, embodiments of present disclosure will be described in detail in conjunction with accompanying drawings.

Figure 1:
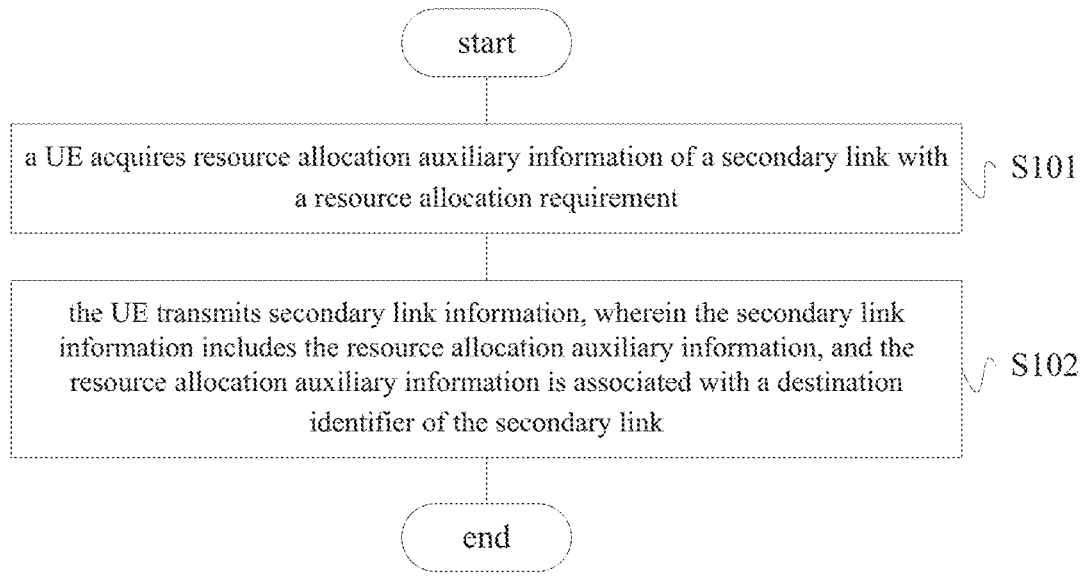
FIG. 1 is a flow chart of a resource allocation method for V2X service according to an embodiment.

FIG. 1 is a flow chart of a resource allocation method for V2X service according to an embodiment. The embodiment may be applied to Internet of Vehicles, such as an NR V2X scenario. The embodiment may be performed by a UE side, for example, by a transmitting UE. The transmitting UE may report secondary link information to a base station using solutions of the embodiment, so that resources allocated by the base station for a corresponding secondary link are more adapted to an actual channel state of the secondary link.

Referring to FIG. 1, the method may include S101 and S102.

In S101, a UE acquires resource allocation auxiliary information of a secondary link with a resource allocation requirement.

In S102, the UE transmits secondary link information, wherein the secondary link information includes the resource allocation auxiliary information, and the resource allocation auxiliary information is associated with a destination identifier of the secondary link.

In some embodiments, the transmitting UE may maintain 4 secondary links. These 4 secondary links may not always have data to be transmitted. Therefore, the method may further include: for each secondary link maintained, determining whether the secondary link has a resource allocation requirement based on data arrival information on the secondary link, which step may be performed prior to S101. Further, for a secondary link with resource allocation requirement, the transmitting UE may use the solution in the embodiment to generate and transmit the secondary link information.

Alternatively, in some embodiments, the generation and transmission of the secondary link information may be triggered by the base station. For example, in response to a report requirement of the base station, the transmitting UE may determine the secondary links with data arriving as secondary links with the resource allocation requirement based on current data report conditions on the maintained secondary links, and generate and report the secondary link information based on resource allocation auxiliary information of these secondary links.

For another example, in response to the report requirement of the base station, the transmitting UE may determine all the secondary links as secondary links with the resource allocation requirement based on current data report conditions on the maintained secondary links, regardless of whether data arrives on the secondary links.

Further, the resource allocation auxiliary information being associated with the destination identifier of the secondary link may refer to distinguishing different secondary links by destination identifiers. By associating the resource allocation auxiliary information with the destination identifier, the base station can reasonably distinguish the resource allocation auxiliary information corresponding to different secondary links based on the received secondary link information.

In some embodiments, the resource allocation auxiliary information may include secondary link channel information, such as Channel Quality Information (CQI) and Rank indicator (RI) both of which are used to determine data transmission information such as Modulation and Coding Scheme (MCS) so as to indicate suitable transmission parameters for data transmission under current channel quality of the corresponding secondary link.

Accordingly, in some embodiments, the secondary link information may include the CQI, the RI, and the destination identifier of the secondary link. In addition, the CQI and the RI are associated with the destination identifier of the secondary link.

Specifically, the transmitting UE may report the secondary link channel information for a unicast link and/or a multicast link established, and may use a destination identifier index to identify the corresponding secondary link.

Figure 2:
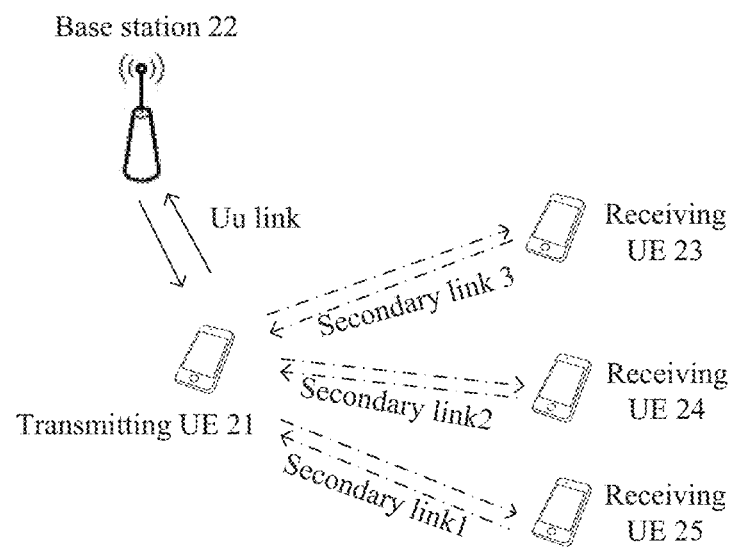
FIG. 2 is a communication diagram of an application scenario according to an embodiment.

For example, referring to FIG. 2, a transmitting UE 21 performs secondary link unicast communication with a receiving UE 23, and a receiving UE 24 and a receiving UE 25, respectively, and the transmitting UE 21 communicates with a base station 22 using Uu link.

Further, the transmitting UE 21 may report to the base station 22 via the Uu link a destination identifier list of receiving UEs with which the transmitting UE 21 performs unicast communication, such as {a destination identifier of the receiving UE 23, a destination identifier of the receiving UE 24, a destination identifier of the receiving UE 25}. The three destination identifiers may correspond to destination identifier indexes of 1, 2 and 3 respectively, which may be represented by 2 bits in the secondary link information.

For example, '00' represents the destination identifier of the receiving UE 23 whose destination identifier index is 1, '01' represents the destination identifier of the receiving UE 24 whose destination identifier index is 2, and '10' represents the destination identifier of the receiving UE 25 whose destination identifier index is 3.

The base station 22 configures a transmission resource for the transmitting UE 21 to transmit the secondary link information. The transmission resource may be a Physical Uplink Control Channel, (PUCCH) resource, or a Physical Uplink Shared Channel (PUSCH) resource.

Further, the transmitting UE 21 transmits the secondary link information on the transmission resource configured by the base station 22 based on secondary link data arrival information of the transmitting UE 21. The secondary link information may include one or more secondary link channel information selected from: destination identifier index '00' and CQI and RI between the transmitting UE 21 and the receiving UE 22, destination identifier index '01' and CQI and RI between the transmitting UE 21 and the receiving UE 24, and destination identifier index '10' and CQI and RI between the transmitting UE 21 and the receiving UE 25.

Assuming that the transmitting UE 21 currently merely has secondary link data arriving on a secondary link 2, the secondary link information reported by the transmitting UE 21 may merely include the destination identifier index '01' and the CQI and the RI between the transmitting UE 21 and the receiving UE 24.

In some embodiments, the resource allocation auxiliary information may include MCS and/or a number of blind retransmissions.

Accordingly, S101 may include: acquiring CQI and RI of the secondary link; and calculating the MCS and/or the number of blind retransmissions of the secondary link based on the CQI and the RI.

That is, in some embodiments, the transmitting UE may voluntarily calculate and determine the MCS and/or the number of blind retransmissions required by the secondary link, and report these parameters to the base station to request the base station to allocate resources for corresponding secondary links based on these parameters.

Accordingly, in some embodiments, the secondary link information may include the MCS and/or the number of blind retransmissions, and the destination identifier of the secondary link. In addition, the MCS and/or the number of blind retransmissions are associated with the destination identifier of the secondary link.

Specifically, the transmitting UE may report the secondary link channel information for a unicast link and/or a multicast link established, and may use a destination identifier index to identify the corresponding secondary link.

For example, continuing to refer to FIG. 2, the transmitting UE 21 performs secondary link unicast communication with the receiving UE 23, the receiving UE 24 and the receiving UE 25, respectively, and the transmitting UE 21 communicates with the base station 22 using Uu link.

Further, the transmitting UE 21 may report to the base station 22 via the Uu link a destination identifier list of receiving UEs with which the transmitting UE 21 performs unicast communication, such as {a destination identifier of the receiving UE 23, a destination identifier of the receiving UE 24, a destination identifier of the receiving UE 25}. The three destination identifiers may correspond to destination identifier indexes of 1, 2 and 3 respectively, which may be represented by 2 bits in the secondary link information.

For example, '00' represents the destination identifier of the receiving UE 23 whose destination identifier index is 1, '01' represents the destination identifier of the receiving UE 24 whose destination identifier index is 2, and '10' represents the destination identifier of the receiving UE 25 whose destination identifier index is 3.

The base station 22 configures a transmission resource for the transmitting UE 21 to transmit secondary link information including the MCS and/or the number of blind retransmissions. The transmission resource may be a PUCCH resource or a PUSCH resource.

Further, based on data arrival information and channel information (such as CQI and RI) of corresponding secondary links, the transmitting UE 21 may calculate the MCS and/or the number of blind retransmissions of each secondary link, and use the transmission resource to report secondary link information to the base station 22. The secondary link information may include one or more secondary link channel information selected from: destination identifier index '00' and MCS and/or the number of blind retransmissions between the transmitting UE 21 and the receiving UE 23, destination identifier index '01' and MCS and/or the number of blind retransmissions between the transmitting UE 21 and the receiving UE 24, and destination identifier index '10' and MCS and/or the number of blind retransmissions between the transmitting UE 21 and the receiving UE 25.

Assuming that the transmitting UE 21 currently has secondary link data arriving on both the secondary link 2 and the secondary link 3, the secondary link information reported by the transmitting UE 21 may include the destination identifier index '01' and the MCS and the number of blind retransmissions between the transmitting UE 21 and the receiving UE 24, and the destination identifier index '10' and the MCS and the number of blind retransmissions between the transmitting UE 21 and the receiving UE 25.

In some embodiments, the resource allocation auxiliary information may include an identifier of a combination of CQI and RI, wherein the CQI and the RI of the secondary link belong to the combination of CQI and RI.

Specifically, the combination of CQI and RI refers to a unique combination composed of a specific range of CQI and a specific value of RI.

For example, assuming that the values of RI are 1 and 2, and the CQI has 4 ranges, there are 8 combinations of CQI and RI. Further, each of the 8 combinations may correspond to an identifier, so as to uniquely determine the corresponding combination of CQI and RI through the identifier.

Accordingly, S101 may include: acquiring the CQI and the RI of the secondary link; and acquiring the identifier of the combination of CQI and RI based on the CQI, the RI and an association relationship between the combination of CQI and RI and the identifier, wherein the association relationship between the combination of CQI and RI and the identifier is determined by configuration or pre-configuration.

For example, determining by configuration may include indicating via a downlink signaling (such as an RRC signaling) transmitted by the base station in advance.

For another example, determining by pre-configuration may include presetting in a Subscriber Identification Module (SIM) associated with the UE.

Accordingly, in some embodiments, the secondary link information may include the identifier of the combination of CQI and RI, and the destination identifier of the secondary link.

Specifically, the transmitting UE may report the secondary link channel information for the unicast link and/or multicast link established, and may use a destination identifier index to identify the corresponding secondary link.

For example, continuing to refer to FIG. 2, the transmitting UE 21 performs secondary link unicast communication with the receiving UE 23, the receiving UE 24 and the receiving UE 25, respectively, and the transmitting UE 21 communicates with the base station 22 using Uu link.

Further, the transmitting UE 21 may report to the base station 22 via the Uu link a destination identifier list of receiving UEs with which the transmitting UE 21 performs unicast communication, such as {the destination identifier of the receiving UE 23, the destination identifier of the receiving UE 24, the destination identifier of the receiving UE 25}. The three destination identifiers may correspond to destination identifier indexes of 1, 2 and 3 respectively, which may be represented by 2 bits in the secondary link information.

For example, '00' represents the destination identifier of the receiving UE 23 whose destination identifier index is 1, '01' represents the destination identifier of the receiving UE 24 whose destination identifier index is 2, and '10' represents the destination identifier of the receiving UE 25 whose destination identifier index is 3.

The base station 22 configures association relationships between multiple combinations of CQI and RI and identifiers for the transmitting UE 21, where each combination of CQI and RI is represented by $\log 2N$ bits, and N is the number of combinations. The base station 22 may further configure a same report resource for multiple combinations of CQI and RI, and the transmitting UE 21 may report the resource allocation auxiliary information in the form of the identifier of the combination of CQI and RI and the destination identifier index on the report resource.

Assuming that the transmitting UE 21 currently merely has secondary link data arriving on the secondary link 2, but the transmitting UE21 decides to report the resource allocation auxiliary information of the secondary link 1 and the secondary link 2, the secondary link information reported by the transmitting UE21 using the report resource may include the destination identifier index '00' and the identifier of the combination of CQI and RI, the CQI and the RI between the transmitting UE 21 and the receiving UE 23 belong to the combination of CQI and RI, and the destination identifier index '01' and the identifier of the combination of CQI and RI.

Therefore, in the embodiments, the combination of CQI and RI is determined in advance, so that the secondary link information concisely includes the identifier of the combination of CQI and RI and the corresponding destination identifier index without indicating a specific value, which may effectively reduce signaling overhead.

Alternatively, in some embodiments, the same combination of CQI and RI may correspond to one or more destination identifier indexes.

In some embodiments, the resource allocation auxiliary information may be indicated by a report resource for transmitting the secondary link information.

Specifically, the report resource may be a PUCCH resource or a PUSCH resource.

Accordingly, S101 may include: acquiring CQI and RI of the secondary link, and S102 may include: determining a combination of CQI and RI, wherein the CQI and the RI of the secondary link belong to the combination of CQI and RI; determining a report resource based on the combination of CQI and RI, where an association relationship between the combination of CQI and RI and the report resource is determined by configuration or pre-configuration; and transmitting the secondary link information using the report resource, wherein the secondary link information includes the destination identifier of the secondary link.

For example, continuing to refer to FIG. 2, the transmitting UE 21 performs secondary link unicast communication with the receiving UE 23, the receiving UE 24 and the receiving UE 25, respectively, and the transmitting UE 21 communicates with the base station 22 using Uu link.

Further, the transmitting UE 21 may report to the base station 22 via the Uu link a destination identifier list of receiving UEs with which the transmitting UE 21 performs unicast communication, such as {the destination identifier of the receiving UE 23, the destination identifier of the receiving UE 24, the destination identifier of the receiving UE 25}. The three destination identifiers may correspond to destination identifier indexes of 1, 2 and 3 respectively, which may be represented by 2 bits in the secondary link information.

For example, '00' represents the destination identifier of the receiving UE 23 whose destination identifier index is 1, '01' represents the destination identifier of the receiving UE 24 whose destination identifier index is 2, and '10' represents the destination identifier of the receiving UE 25 whose destination identifier index is 3.

The base station 22 configures multiple combinations of CQI and RI for the transmitting UE 21, and configures a corresponding report resource for each combination of CQI and RI, and the transmitting UE 21 transmits one or more destination identifier indexes that satisfy the combination of CQI and RI on the corresponding report resource.

Assume that the transmitting UE 21 currently has secondary link data arriving on the secondary link 2 and the secondary link 3, the combination of CQI and RI to which the CQI and the RI between the transmitting UE 21 and the receiving UE 24 belong corresponds to report resource 1, and the combination of CQI and RI to which the CQI and the RI between the transmitting UE 21 and the receiving UE 25 belong corresponds to report resource 2. Accordingly, the transmitting UE 21 may use the report resource 1 to transmit secondary link information 1 which may include a destination identifier index 01, and further use the report resource 2 to transmit secondary link information 2 which may include a destination identifier index 10.

As the base station 22 knows the association relationship between the combination of CQI and RI and the report resource in advance, even if the identifier of the combination of CQI and RI is not included in the received secondary link information, the transmitting UE 21 can still implicitly indicate the combination of CQI and RI corresponding to the destination identifier index via the report resource used for transmitting the secondary link information.

Therefore, compared with the embodiments where the secondary link channel information is indicated via the identifier of the combination of CQI and RI, these embodiments can indicate the reported combination of CQI and RI of the secondary link to the base station in an implicit indication manner, thereby further reducing signaling overhead.

Further, indicating the destination identifier of the secondary link through the destination identifier index may include: the transmitting UE reporting to the base station a destination identifier list in advance to notify the base station of destination identifiers of multiple destinations for secondary link communication. Destination identifier indexes corresponding to the destination identifiers may be automatically generated based on an order of the destination identifier list. More details of the destination identifier list may be referred to the foregoing embodiments.

For example, the destination identifier list may include two columns of serial numbers and destination identifiers, where the serial number is the destination identifier index of the destination identifier in a same row. Therefore, in subsequent communication between the base station and the transmitting UE, the destination identifier indexes may be used to indicate the destination identifiers so as to reduce signaling overhead.

For another example, the destination identifier list may include one column of destination identifiers, wherein an order of the destination identifiers in the destination identifier list may implicitly indicate destination identifier indexes of destination identifiers. That is, the destination identifier index of the destination identifier ranked first in the destination identifier list is 1, the destination identifier index of the destination identifier ranked second in the destination identifier list is 2, and so on. In this way, signaling overhead of the transmitting UE reporting the destination identifier list may be further reduced.

From above, for the UE side, embodiments of the present disclosure may optimize contents contained in secondary link information reported by the UE in mode 1, so that the base station can accurately acquire specific information (such as an actual channel state of each secondary link) of multiple secondary links maintained by the same transmitting UE, and allocate resources in a targeted manner based on data transmission requirements on each secondary link, which may avoid confusion among multiple secondary links.

Figure 3:
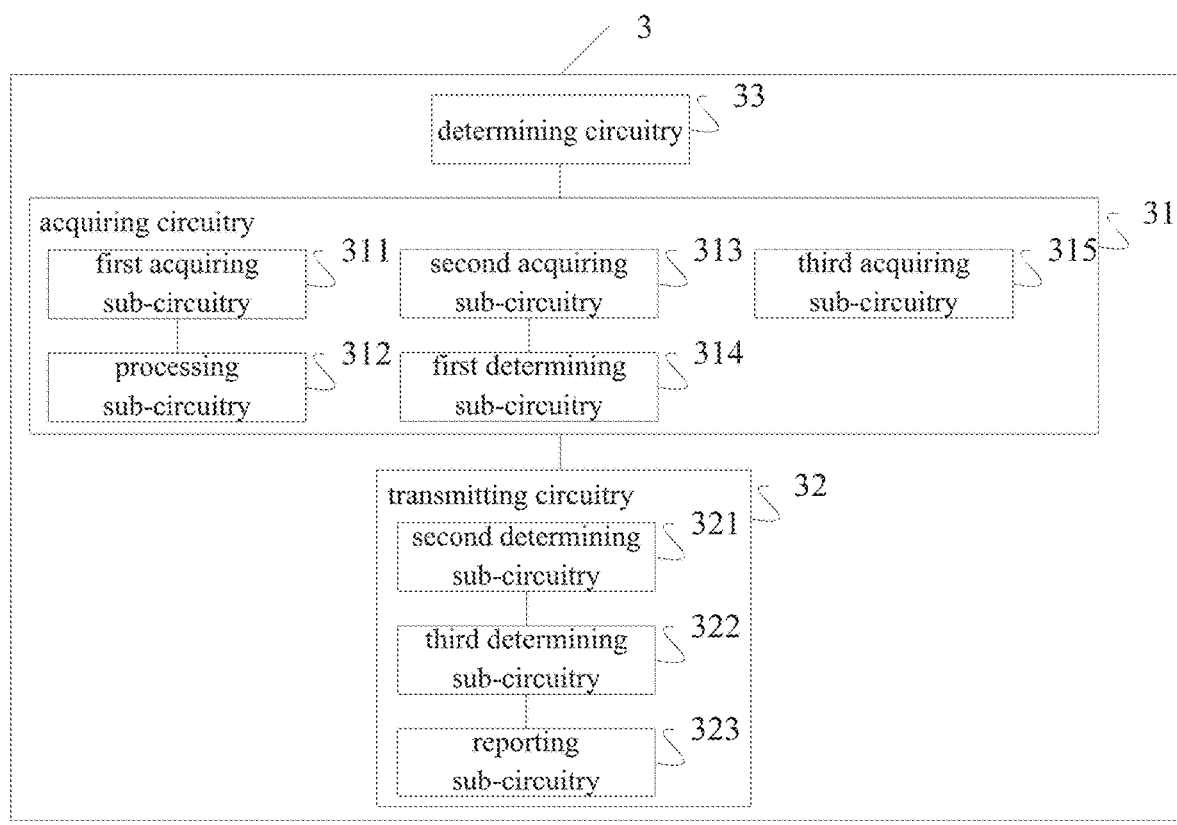
FIG. 3 is a structural diagram of a resource allocation apparatus for V2X service according to an embodiment.

FIG. 3 is a structural diagram of a resource allocation apparatus for V2X service according to an embodiment. Those skilled in the art could understand that the resource allocation apparatus 3 for V2X service described in the embodiment can be used to perform the method in the embodiments as shown in FIGS. 1 and 2.

In some embodiments, the resource allocation apparatus 3 includes: an acquiring circuitry 31 configured to acquire resource allocation auxiliary information of a secondary link with a resource allocation requirement; and a transmitting circuitry 32 configured to transmit secondary link information, wherein the secondary link information includes the resource allocation auxiliary information, and the resource allocation auxiliary information is associated with a destination identifier of the secondary link.

In some embodiments, the resource allocation auxiliary information includes CQI and RI, and the secondary link information includes the CQI, the RI and the destination identifier of the secondary link.

In some embodiments, the resource allocation auxiliary information includes MCS and/or a number of blind retransmissions, and the acquiring circuitry 31 includes: a first acquiring sub-circuitry 311 configured to acquire CQI and RI of the secondary link; and a processing sub-circuitry 312 configured to calculate the MCS and/or the number of blind retransmissions of the secondary link based on the CQI and the RI.

In some embodiments, the secondary link information includes the MCS and/or the number of blind retransmissions, and the destination identifier of the secondary link.

In some embodiments, the resource allocation auxiliary information includes an identifier of a combination of CQI and RI, CQI and RI of the secondary link belong to the combination of CQI and RI, and the acquiring circuitry 31 includes: a second acquiring sub-circuitry 313 configured to acquire the CQI and the RI of the secondary link; and a first determining sub-circuitry 314 configured to determine the identifier of the combination of CQI and RI, based on the CQI, the RI and an association relationship between the combination of CQI and RI and the identifier, wherein the association relationship between the combination of CQI and RI and the identifier is determined by configuration or pre-configuration.

In some embodiments, the secondary link information includes the identifier of the combination of CQI and RI and the destination identifier of the secondary link.

In some embodiments, the resource allocation auxiliary information is indicated by a report resource for transmitting the secondary link information.

In some embodiments, the acquiring circuitry 31 includes a third acquiring sub-circuitry 315 configured to acquire CQI and RI of the secondary link, and the transmitting circuitry 32 includes: a second determining sub-circuitry 321 configured to determine a combination of CQI and RI, wherein the CQI and the RI of the secondary link belong to the combination of CQI and RI, and the combination of CQI and RI is determined by configuration or pre-configuration; a third determining sub-circuitry 322 configured to determine the report resource based on the combination of CQI and RI, where an association relationship between the combination of CQI and RI and the report resource is determined by configuration or pre-configuration; and a reporting sub-circuitry 323 configured to transmit the secondary link information using the report resource, wherein the secondary link information includes the destination identifier of the secondary link.

In some embodiments, the resource allocation apparatus 3 further includes a determining circuitry 33 configured to: for each secondary link maintained, determine whether the secondary link has a resource allocation requirement based on data arrival information on the secondary link.

In some embodiments, the destination identifier of the secondary link is indicated by a destination identifier index.

More details of working principles and working modes of the resource allocation apparatus 3 can be found in the above descriptions of FIGS. 1 and 2, and are not described here.

Figure 4:
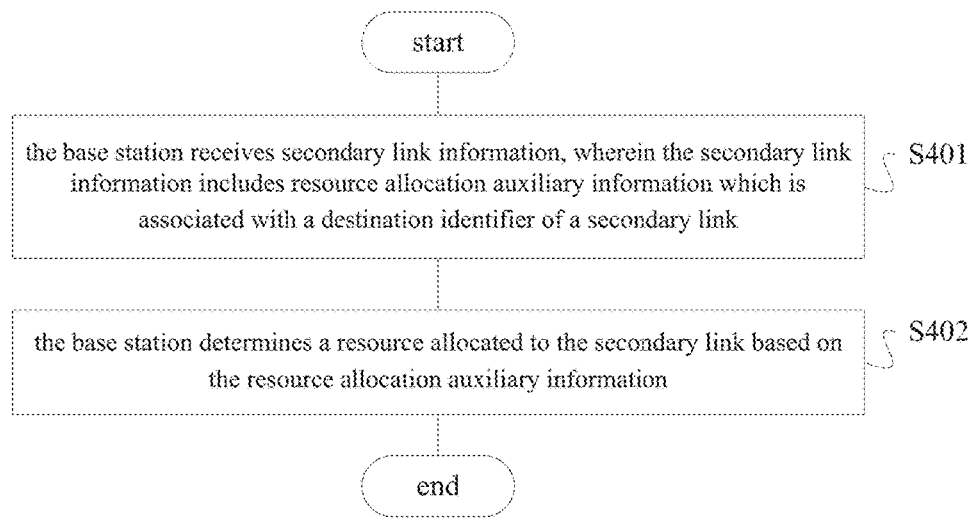
FIG. 4 is a flow chart of a resource allocation method for V2X service according to an embodiment.

FIG. 4 is a flow chart of a resource allocation method for V2X service according to an embodiment. The embodiment may be applied to Internet of Vehicles, such as an NR V2X scenario. The embodiment may be performed by a network side, for example, by a base station at the network side. In response to receiving secondary link information reported by a transmitting UE using the method described in the embodiments as shown in FIGS. 1 and 2, the base station may allocate for a secondary link reported by a transmitting UE a resource more adapted to an actual channel state of the secondary link based on resource allocation auxiliary information in the secondary link information.

Referring to FIG. 4, the method may include S401 and S402.

In S401, the base station receives secondary link information, wherein the secondary link information includes resource allocation auxiliary information which is associated with a destination identifier of a secondary link.

In S402, the base station determines a resource allocated to the secondary link based on the resource allocation auxiliary information.

Those skilled in the art could understand that S401 and S402 correspond to S101 and S102 in the embodiment as shown in FIG. 1, and the two are complementary to each other in terms of specific implementation principles and logic. Therefore, explanation of terms involved in the embodiment may be referred to related description of the embodiment as shown in FIG. 1, which is not described in detail here.

From above, to the base station side, embodiments of the present disclosure enable the base station to accurately acquire specific information (such as an actual channel state of each secondary link) of multiple secondary links maintained by the same transmitting UE, and to allocate resources in a targeted manner based on data transmission requirements on each secondary link, which may improve a success rate of data transmission on each secondary link.

In some embodiments, the resource allocation auxiliary information includes CQI and RI.

Accordingly, the secondary link information includes the CQI, the RI, and the destination identifier of the secondary link, and the CQI and the RI are associated with the destination identifier of the secondary link.

Accordingly, S402 includes: calculating MCS and/or a number of blind retransmissions based on the CQI and the RI; and determining the resource allocated to the secondary link indicated by the destination identifier of the secondary link based on the MCS and/or the number of blind retransmissions.

In the above embodiments, the transmitting UE may report to the base station the CQI and RI of the secondary link with the resource allocation requirement. The base station calculates the corresponding MCS and/or the number of blind retransmissions based on the received parameter information, and allocates appropriate resources to the corresponding secondary link based on the calculated information.

Further, a destination identifier index may be used to indicate the corresponding destination identifier to reduce signaling overhead. An association relationship between the destination identifier index and the destination identifier may be indicated explicitly or implicitly via a destination identifier list of the transmitting UE in advance.

In some embodiments, the resource allocation auxiliary information includes MCS and/or a number of blind retransmissions.

Accordingly, the secondary link information includes the MCS and/or the number of blind retransmissions, and the destination identifier of the secondary link, and the MCS and/or the number of blind retransmissions are associated with the destination identifier of the secondary link.

Accordingly, S402 includes: determining the resource allocated to the secondary link indicated by the destination identifier of the secondary link based on the MCS and/or the number of blind retransmissions.

In the above embodiments, the transmitting UE calculates the MCS and/or the number of blind retransmissions based on the CQI and RI, and the base station directly determines whether a corresponding resource can be allocated based on the MCS and/or the number of blind retransmissions reported by the transmitting UE.

In some embodiments, the resource allocation auxiliary information includes an identifier of a combination of CQI and RI, wherein CQI and RI of the secondary link belong to the combination of CQI and RI.

Accordingly, the secondary link information includes the identifier of the combination of CQI and RI and the destination identifier of the secondary link, and the identifier of the combination of CQI and RI is associated with the destination identifier of the secondary link.

Accordingly, S402 includes: determining the combination of CQI and RI based on the identifier of the combination of CQI and RI, wherein an association relationship between the combination of CQI and RI and the identifier is determined by configuration or pre-configuration; and determining the resource allocated to the secondary link indicated by the destination identifier of the secondary link based on the combination of CQI and RI.

In the above embodiments, the base station pre-configures the combination of CQI and RI and the corresponding identifier for the transmitting UE. Further, the transmitting UE reports the identifier of the combination of CQI and RI for the secondary link with a resource allocation requirement, so that the CQI and RI related information of the secondary link is reported to the base station with lower signaling overhead. Further, the base station determines the CQI and RI related information of the secondary link based on the identifier of the combination of CQI and RI in the received secondary link information, and then allocates appropriate resources for the secondary link.

In some embodiments, the resource allocation auxiliary information is indicated by a report resource for transmitting the secondary link information.

Accordingly, the secondary link information includes the destination identifier of the secondary link. Further, the destination identifier of the secondary link is indicated by a destination identifier index.

Accordingly, S402 includes: determining a combination of CQI and RI based on the report resource for transmitting the secondary link information, wherein the CQI and the RI of the secondary link belong to the combination of CQI and RI, an association relationship between the combination of CQI and RI and the report resource is determined by configuration or pre-configuration; and determining the resource allocated to the secondary link indicated by the destination identifier of the secondary link based on the combination of CQI and RI.

In the above embodiments, the base station pre-configures different report resources for different combinations of CQI and RI, and indicate the association relationship between the combination of CQI and RI and the report resources to the transmitting UE in advance. Further, after determining the combination of CQI and RI for the secondary link with the resource allocation requirement, the transmitting UE may determine the report resource to be used based on the association relationship between the combination of CQI and RI and the report resource, and use the report resource to transmit the destination identifier of the secondary link. Further, based on the report resource used by the received secondary link information, the base station may determine the combination of CQI and RI associated with the destination identifier of the secondary link included in the secondary link information, then determine the CQI and RI related information of the secondary link, and allocate appropriate resources for the secondary link.

In some embodiments, following S402, the method further includes: transmitting indication information to indicate the resource allocated to the secondary link, where the resource is associated with the destination identifier of the secondary link.

In some embodiments, the indication information may be Downlink Control Information (DCI).

Further, the base station may indicate in a DCI related information about resources allocated for a secondary link reported by the transmitting UE. That is, when the transmitting UE reports the resource allocation auxiliary information of multiple secondary links in the same secondary link information, the base station may respectively transmit the corresponding DCI for each secondary link to indicate information about the resource allocated for the secondary link.

For example, for four secondary links indicated in the secondary link information reported by the transmitting UE, the base station may determine that resources can be allocated to three of the secondary links based on the resource allocation auxiliary information in the secondary link information. Accordingly, the base station transmits three DCIs, where each DCI includes a destination identifier index of one of the three secondary links, and the destination identifier index of the secondary link is associated with some transmission parameter information, such as time-frequency domain information of the resource allocated for the secondary link, MCS and the number of blind retransmissions.

Alternatively, in some embodiments, the base station may indicate in a DCI related information of the resources allocated respectively for multiple secondary links reported by the transmitting UE.

For example, for four secondary links indicated in the secondary link information reported by the transmitting UE, the base station may determine that resources can be allocated to three of the secondary links based on the resource allocation auxiliary information in the secondary link information. Accordingly, the DCI may include destination identifier indexes of the three secondary links, and the destination identifier index of each secondary link is associated with some transmission parameter information, such as time-frequency domain information of the resource allocated for the secondary link, MCS, and the number of blind retransmissions, etc.

From above, to the base station side, embodiments of the present disclosure enable the base station to accurately acquire specific information (such as an actual channel state of each secondary link) of multiple secondary links maintained by the same transmitting UE, and to allocate resources in a targeted manner based on data transmission requirements on each secondary link, which may improve a success rate of data transmission on each secondary link.

Figure 5:
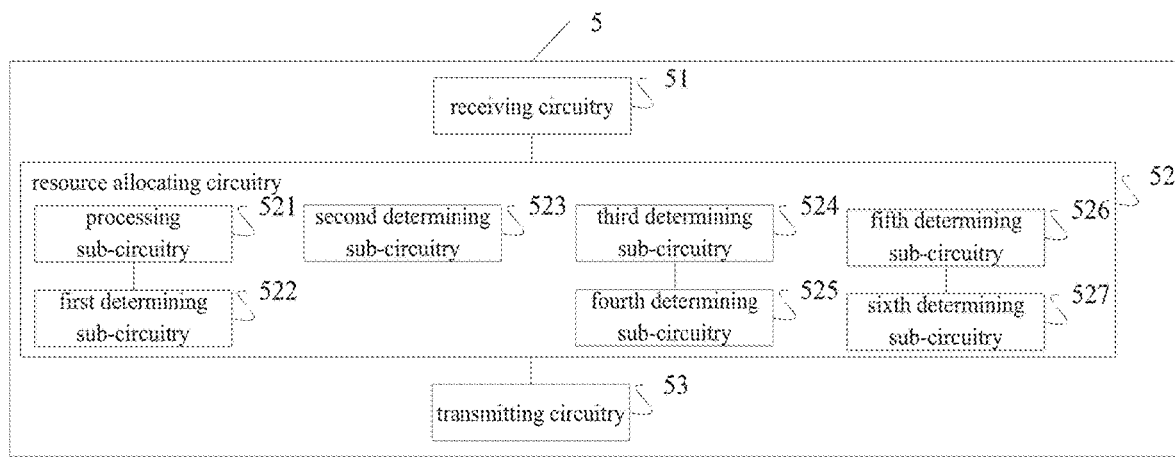
FIG. 5 is a structural diagram of a resource allocation apparatus for V2X service according to an embodiment.

FIG. 5 is a structural diagram of a resource allocation apparatus for V2X service according to an embodiment. Those skilled in the art could understand that the resource allocation apparatus 5 for V2X service provided in the embodiment may be used to implement the method provided in the embodiment as shown in FIG. 4.

In the embodiment, the resource allocation apparatus 5 may include: a receiving circuitry 51 configured to receive secondary link information, wherein the secondary link information includes resource allocation auxiliary information which is associated with a destination identifier of a secondary link; and a resource allocating circuitry 52 configured to determine a resource allocated to the secondary link based on the resource allocation auxiliary information.

In some embodiments, the resource allocation auxiliary information includes CQI and RI, the secondary link information includes the CQI, the RI, and the destination identifier of the secondary link, and the resource allocating circuitry 52 includes: a processing sub-circuitry 521 configured to calculate MCS and/or a number of blind retransmissions based on the CQI and the RI; and a first determining sub-circuitry 522 configured to determine the resource allocated to the secondary link indicated by the destination identifier of the secondary link based on the MCS and/or the number of blind retransmissions.

In some embodiments, the resource allocation auxiliary information includes MCS and/or a number of blind retransmissions, and the secondary link information includes the MCS and/or the number of blind retransmissions, and the resource allocating circuitry 52 includes a second determining sub-circuitry 523 configured to determine the resource allocated to the secondary link indicated by the destination identifier of the secondary link based on the MCS and/or the number of blind retransmissions.

In some embodiments, the resource allocation auxiliary information includes an identifier of a combination of CQI and RI, CQI and RI of the secondary link belong to the combination of CQI and RI, the secondary link information includes the identifier of the combination of CQI and RI and the destination identifier of the secondary link, and the resource allocating circuitry 52 includes: a third determining sub-circuitry 524 configured to determine the combination of CQI and RI based on the identifier of the combination of CQI and RI, wherein an association relationship between the combination of CQI and RI and the identifier is determined by configuration or pre-configuration; and a fourth determining sub-circuitry 525 configured to determine the resource allocated to the secondary link indicated by the destination identifier of the secondary link based on the combination of CQI and RI.

In some embodiments, the resource allocation auxiliary information is indicated by a report resource for transmitting the secondary link information.

In some embodiments, the secondary link information includes the destination identifier of the secondary link, and the resource allocating circuitry 52 includes: a fifth determining sub-circuitry 526 configured to determine a combination of CQI and RI based on the report resource for transmitting the secondary link information, wherein the CQI and the RI of the secondary link belong to the combination of CQI and RI, and an association relationship between the combination of CQI and RI and the report resource is determined by configuration or pre-configuration; and a sixth determining sub-circuitry 527 configured to determine the resource allocated to the secondary link indicated by the destination identifier of the secondary link based on the combination of CQI and RI.

In some embodiments, the resource allocation apparatus 5 further includes a transmitting circuitry 53 configured to transmit indication information to indicate the resource allocated to the secondary link, where the resource is associated with the destination identifier of the secondary link.

In some embodiments, the destination identifier of the secondary link is indicated by a destination identifier index.

More details of working principles and working modes of the resource allocation apparatus 5 can be found in the above descriptions of FIG. 4, and are not described here.

In an application scenario, continuing to refer to FIG. 2, based on the transmitting UE 21 has data to transmit to one or more receiving UEs including the receiving UE 23 to the receiving UE 25, the transmitting UE 21 may request the base station 22 for transmission resources, and report secondary link information via the transmission resources.

Further, a corresponding Buffer Status Report (BSR) includes destination identifier index information.

In response to receiving the secondary link information, the base station 22 may allocate transmission parameters such as a time-frequency transmission resource, MCS and the number of blind retransmissions for the corresponding secondary link, and indicate the transmission parameters via DCI. The DCI may also include the destination identifier index corresponding to the scheduled time-frequency transmission resource, so that the transmitting UE 21 can accurately determine the secondary link to which the scheduled time-frequency transmission resource allocated by the base station 22 points.

The resource allocation auxiliary information may be selected from: CQI and RI, MCS and/or the number of blind retransmissions, or the identifier of the combination of CQI and RI.

In an embodiment of the present disclosure, a storage medium having computer instructions stored therein is provided, wherein when the computer instructions are executed, the above method as shown in FIGS. 1 and 4 is performed. In some embodiments, the storage medium may include a computer readable storage medium, such as a non-volatile memory or a non-transitory memory. The computer readable storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above method as shown in FIG. 1 is performed. In some embodiments, the terminal may be a UE applied in an NR V2X scenario, such as a receiving UE in NR V2X unicast or multicast scenarios.

In an embodiment of the present disclosure, a base station including a memory and a processor is provided, wherein the memory has computer instructions stored therein, and when the processor executes the computer instructions, the above method as shown in FIG. 4 is performed. In some embodiments, the base station may be a base station applied in an NR V2X scenario, such as a gNB.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A resource allocation method for Vehicle-to-Everything (V2X) service, comprising:
acquiring resource allocation auxiliary information of a secondary link with a resource allocation requirement; and
transmitting secondary link information, wherein the secondary link information comprises the resource allocation auxiliary information, and the resource allocation auxiliary information is associated with a destination identifier of the secondary link;
wherein the resource allocation auxiliary information is indicated by a report resource for transmitting the secondary link information;
wherein said acquiring the resource allocation auxiliary information of the secondary link comprises acquiring CQI and RI of the secondary link, and said transmitting secondary link information comprises:
determining a combination of CQI and RI, wherein the CQI and the RI of the secondary link belong to the combination of CQI and RI, and the combination of CQI and RI is determined by configuration or pre-configuration;
determining the report resource based on the combination of CQI and RI, where an association relationship between the combination of CQI and RI and the report resource is determined by configuration or pre-configuration; and
transmitting the secondary link information using the report resource, wherein the secondary link information comprises the destination identifier of the secondary link.

2. The method according to claim 1, wherein the resource allocation auxiliary information comprises Modulation and Coding Scheme (MCS) and/or a number of blind retransmissions, and said acquiring the resource allocation auxiliary information of the secondary link comprises:
acquiring CQI and RI of the secondary link; and
calculating the MCS and/or the number of blind retransmissions of the secondary link based on the CQI and the RI.

3. The method according to claim 2, wherein the secondary link information comprises the MCS and/or the number of blind retransmissions, and the destination identifier of the secondary link.

4. The method according to claim 1, wherein the resource allocation auxiliary information comprises an identifier of a combination of CQI and RI, CQI and RI of the secondary link belong to the combination of CQI and RI, and said acquiring the resource allocation auxiliary information of the secondary link comprises:
acquiring the CQI and the RI of the secondary link; and
determining the identifier of the combination of CQI and RI, based on the CQI, the RI and an association relationship between the combination of CQI and RI and the identifier, wherein the association relationship between the combination of CQI and RI and the identifier is determined by configuration or pre-configuration.

5. The method according to claim 4, wherein the secondary link information comprises the identifier of the combination of CQI and RI and the destination identifier of the secondary link.

6. The method according to claim 1, further comprising:
for each secondary link maintained, determining whether the secondary link has a resource allocation requirement based on data arrival information on the secondary link.

7. The method according to claim 1, wherein the destination identifier of the secondary link is indicated by a destination identifier index.

8. A resource allocation method for Vehicle-to-Everything (V2X) service, comprising:
receiving secondary link information, wherein the secondary link information comprises resource allocation auxiliary information which is associated with a destination identifier of a secondary link; and
determining a resource allocated to the secondary link based on the resource allocation auxiliary information;
wherein the resource allocation auxiliary information is indicated by a report resource for transmitting the secondary link information;
wherein the secondary link information comprises the destination identifier of the secondary link, and said determining a resource allocated to the secondary link based on the resource allocation auxiliary information comprises:
determining a combination of CQI and RI based on the report resource for transmitting the secondary link information, wherein the CQI and the RI of the secondary link belong to the combination of CQI and RI, and an association relationship between the combination of CQI and RI and the report resource is determined by configuration or pre-configuration; and
determining the resource allocated to the secondary link indicated by the destination identifier of the secondary link based on the combination of CQI and RI.

9. The method according to claim 8, wherein the resource allocation auxiliary information comprises Channel Quality Information (CQI) and Rank indicator (RI), the secondary link information comprises the CQI, the RI, and the destination identifier of the secondary link, and said determining a resource allocated to the secondary link based on the resource allocation auxiliary information comprises:
calculating Modulation and Coding Scheme (MCS) and/or a number of blind retransmissions based on the CQI and the RI; and
determining the resource allocated to the secondary link indicated by the destination identifier of the secondary link based on the MCS and/or the number of blind retransmissions.

10. The method according to claim 8, wherein the resource allocation auxiliary information comprises MCS and/or a number of blind retransmissions, and the secondary link information comprises the MCS and/or the number of blind retransmissions, and the destination identifier of the secondary link, and said determining a resource allocated to the secondary link based on the resource allocation auxiliary information comprises:
determining the resource allocated to the secondary link indicated by the destination identifier of the secondary link based on the MCS and/or the number of blind retransmissions.

11. The method according to claim 8, wherein the resource allocation auxiliary information comprises an identifier of a combination of CQI and RI, CQI and RI of the secondary link belong to the combination of CQI and RI, the secondary link information comprises the identifier of the combination of CQI and RI and the destination identifier of the secondary link, and said determining a resource allocated to the secondary link based on the resource allocation auxiliary information comprises:
determining the combination of CQI and RI based on the identifier of the combination of CQI and RI, wherein an association relationship between the combination of CQI and RI and the identifier is determined by configuration or pre-configuration; and
determining the resource allocated to the secondary link indicated by the destination identifier of the secondary link based on the combination of CQI and RI.

12. The method according to claim 8, further comprising:
transmitting indication information to indicate the resource allocated to the secondary link, where the resource is associated with the destination identifier of the secondary link.

13. The method according to claim 8, wherein the destination identifier of the secondary link is indicated by a destination identifier index.

14. A non-transitory storage medium storing one or more programs, the one or more programs comprising computer instructions, which, when executed by a processor, cause the processor to:
acquire resource allocation auxiliary information of a secondary link with a resource allocation requirement; and
transmit secondary link information, wherein the secondary link information comprises the resource allocation auxiliary information, and the resource allocation auxiliary information is associated with a destination identifier of the secondary link;
wherein the resource allocation auxiliary information is indicated by a report resource for transmitting the secondary link information;
wherein said acquiring the resource allocation auxiliary information of the secondary link comprises acquiring CQI and RI of the secondary link, and said transmitting secondary link information comprises:

determining a combination of CQI and RI, wherein the CQI and the RI of the secondary link belong to the combination of CQI and RI, and the combination of CQI and RI is determined by configuration or pre-configuration;

determining the report resource based on the combination of CQI and RI, where an association relationship between the combination of CQI and RI and the report resource is determined by configuration or pre-configuration; and transmitting the secondary link information using the report resource, wherein the secondary link information comprises the destination identifier of the secondary link.

15. A non-transitory storage medium storing one or more programs, the one or more programs comprising computer instructions, which, when executed by a processor, cause the processor to:

receive secondary link information, wherein the secondary link information comprises resource allocation auxiliary information which is associated with a destination identifier of a secondary link; and determine a resource allocated to the secondary link based on the resource allocation auxiliary information;

wherein the resource allocation auxiliary information is indicated by a report resource for transmitting the secondary link information;

wherein the secondary link information comprises the destination identifier of the secondary link, and said determining a resource allocated to the secondary link based on the resource allocation auxiliary information comprises:

determining a combination of CQI and RI based on the report resource for transmitting the secondary link information, wherein the CQI and the RI of the secondary link belong to the combination of CQI and RI, and an association relationship between the combination of CQI and RI and the report resource is determined by configuration or pre-configuration; and determining the resource allocated to the secondary link indicated by the destination identifier of the secondary link based on the combination of CQI and RI.

* * * * *